(12) United States Patent
Wuerthele et al.

(10) Patent No.: US 11,608,957 B1
(45) Date of Patent: Mar. 21, 2023

(54) VEHICLE EXTERIOR OPTICAL DEVICE HAVING MOLDED PLASTIC DEVICE TO CONTROL LIGHTING OUTPUT

(71) Applicant: Toyota Motor Engineering & Manufacturing North America, Inc., Plano, TX (US)

(72) Inventors: Stuart R. Wuerthele, Saline, MI (US); Jose Hernan Hernandez, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/670,344

(22) Filed: Feb. 11, 2022

(51) Int. Cl.
| | |
|---|---|
| *B60Q 1/22* | (2006.01) |
| *F21S 41/43* | (2018.01) |
| *F21S 41/143* | (2018.01) |
| *F21S 41/19* | (2018.01) |
| *F21V 19/00* | (2006.01) |
| *F21S 41/265* | (2018.01) |
| *B60Q 1/24* | (2006.01) |
| *B60Q 1/00* | (2006.01) |
| *F21Y 115/10* | (2016.01) |

(52) U.S. Cl.
CPC .............. *F21S 41/435* (2018.01); *B60Q 1/24* (2013.01); *F21S 41/143* (2018.01); *F21S 41/19* (2018.01); *F21S 41/265* (2018.01); *F21V 19/004* (2013.01); *B60Q 1/0023* (2013.01); *F21Y 2115/10* (2016.08)

(58) Field of Classification Search
CPC ...... F21S 41/141; F21S 41/143; F21S 41/435; F21V 11/16; F21W 2102/10; F21W 2102/17; B60Q 1/22
See application file for complete search history.

(56) References Cited

U.S. PATENT DOCUMENTS

| | | | | | |
|---|---|---|---|---|---|
| 1,520,480 | A | * | 12/1924 | Robertson | F21S 41/28 362/235 |
| 1,735,090 | A | * | 11/1929 | Pollard | F21S 41/365 362/255 |
| 2,783,365 | A | * | 2/1957 | Wilfert | B60Q 3/80 362/265 |

(Continued)

FOREIGN PATENT DOCUMENTS

| | | |
|---|---|---|
| DE | 10026320 | 1/2001 |
| FR | 3014787 | 6/2015 |

OTHER PUBLICATIONS

*Switchback LED Daytime Running Light Shroud* by iJDMTOY.com Automotive Lighting website, 4 pages.

*Primary Examiner* — Ismael Negron
(74) *Attorney, Agent, or Firm* — Snell & Wilmer LLP

(57) ABSTRACT

An optical device configured to be attached to a rear of a vehicle to provide exterior lighting, and to control the direction and intensity of the exterior lighting. The optical device having a socket configured to be attached to the rear of the vehicle, a light positioned within the socket and configured to emit light rays, an inner lens positioned within the socket and configured to receive the light rays, an outer lens positioned within the socket and surrounding the inner lens, and a molded plastic device positioned in front of or attached to the outer lens to create a cut pattern to allow the light rays to be focused in a desired area.

18 Claims, 9 Drawing Sheets

(56) References Cited

U.S. PATENT DOCUMENTS

| | | | |
|---|---|---|---|
| 5,709,453 A | 1/1998 | Krent et al. | |
| 6,461,024 B1 * | 10/2002 | Becker | F21V 5/008 362/187 |
| 7,220,029 B2 * | 5/2007 | Bynum | B60Q 3/80 362/523 |
| 7,311,426 B2 * | 12/2007 | Tiesler | B60Q 3/51 362/523 |
| 7,404,655 B2 | 7/2008 | Walser et al. | |
| 7,703,961 B2 | 4/2010 | Yatsuda et al. | |
| 9,228,711 B2 | 1/2016 | Park | |
| 9,429,296 B2 | 8/2016 | Randolph et al. | |
| 9,487,159 B2 | 11/2016 | Achenbach | |
| 9,821,711 B2 | 11/2017 | Grosdidier | |
| 10,247,384 B1 * | 4/2019 | Feinbloom | F21V 17/12 |
| 10,267,495 B1 * | 4/2019 | Boiragi | F21V 17/16 |
| 10,302,266 B2 | 5/2019 | Luo et al. | |
| 10,836,320 B2 | 11/2020 | Shah et al. | |
| 10,845,023 B2 | 11/2020 | Hansen et al. | |
| 10,940,810 B2 | 3/2021 | Huttenlocher | |
| 10,969,088 B1 | 4/2021 | Erdener et al. | |
| 11,117,510 B2 * | 9/2021 | Weber | B60Q 1/32 |
| 11,241,997 B2 * | 2/2022 | Egbert, II | B60Q 1/24 |
| 2010/0078946 A1 * | 4/2010 | Sun | B60Q 1/44 292/336.3 |
| 2018/0304805 A1 * | 10/2018 | Villacres Mesias | B60Q 1/24 |
| 2020/0247310 A1 * | 8/2020 | Terry | B60Q 1/0088 |

* cited by examiner

US 11,608,957 B1

VEHICLE EXTERIOR OPTICAL DEVICE HAVING MOLDED PLASTIC DEVICE TO CONTROL LIGHTING OUTPUT

BACKGROUND

1. Field

The present disclosure relates to a gasket or a molded plastic device to control the direction and intensity of exterior lighting of a vehicle.

2. Description of the Related Art

When a driver of a vehicle needs to illuminate the outside of the vehicle, the driver may turn on the front headlights, steer the vehicle towards a certain direction, and then place the vehicle in park. The front headlights of the vehicle can provide much needed illumination towards the front of the vehicle. However, if the driver needs illumination on the sides or the rear of the vehicle this may be more difficult. For example, some vehicle may have an integrated spotlight on one or both sides of the vehicle. The spotlight is typically connected to the vehicle near the driver's window or the passenger's window. The driver or the passenger may then adjust or control the spotlight with limited movement due to it being attached to the vehicle.

Illuminating the rear of the vehicle, on the other hand, is very tough. No bright lights are generally present to assist in illuminating the rear of the vehicle. Therefore, the driver or the passenger may need to locate a flashlight to hold and use for illuminating the rear of the vehicle. The flashlight may be awkward to handle, difficult to store or will lose its battery life over time making it inoperable. For example, the user may want to use his or her hands to handle packages or other items or to connect the vehicle to a trailer hitch. Holding the flashlight while needing the hands for other tasks may be difficult and not feasible. Also, if the driver is driving the vehicle, the driver will be unable to hold and/or direct a spotlight or a flashlight to the rear of the vehicle.

The vehicle (e.g., a truck or SUV) may also need additional light to perform certain operations or certain options. For example, in cases where the vehicle has the capability of towing, some systems may require a good amount of light in some areas to be able to detect the trailer and perform towing tasks.

Thus, there is a need in the art for an optical device or system for illuminating the rear of a vehicle, such as an area near and/or at a trailer hitch, and/or for providing additional illumination to a driver of a vehicle.

SUMMARY

Described herein is an optical device configured to be attached to a rear of a vehicle to control the direction and intensity of exterior lighting of the vehicle. The optical device having a light emitting diode (LED) socket configured to be attached to the rear of the vehicle, a light positioned within the LED socket and configured to emit light rays, an inner lens positioned within the LED socket and configured to receive the light rays, an outer lens positioned within the LED socket and surrounding the inner lens to protect the inner lens, and a gasket positioned in front of or attached to the outer lens to create a cut pattern to allow the light rays to be focused in a desired area or region. In some embodiments, the gasket (e.g., a front gasket) may be placed in front of or attached to the outer lens to create a cut pattern to allow the light to be focused in a desired area or region. This creates an optical system that in combination with the LED socket, the inner lens, and the outer lens, directs the light towards a desired area or region of the rear of the vehicle.

An optical device configured to be attached to a rear of a vehicle to control the direction and intensity of exterior lighting of the vehicle. The optical device has a light emitting diode (LED) socket configured to be attached to the rear of the vehicle, a light positioned within the LED socket and configured to emit light rays, an inner lens positioned within the LED socket and configured to receive the light rays, an outer lens positioned within the LED socket and surrounding the inner lens to protect the inner lens, and a gasket blocking a portion of the outer lens to direct the light rays to be focused in a desired area or region.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes an integrated, removable and/or replaceable optical device or system having a gasket or a molded plastic device to control the direction and intensity of exterior lighting of a vehicle. The optical system is configured to be attached to a rear of a vehicle with or without a tow hitch and positioned to direct light towards the rear (e.g., the ground behind) of the vehicle and/or near or towards the tow hitch. The optical device can also be automatically or manually adjusted by a head unit or a remote device (e.g., a smart phone) so the light beams can be directed towards the rear of the vehicle to allow for better parking, better rear lighting, and/or better rear driving (i.e., reversing) of the vehicle. The devices or systems provide various benefits and advantages such as providing a gasket or a molded plastic device to control the direction and intensity of exterior lighting of a vehicle.

An optical device configured to be attached to a rear of a vehicle to control the direction and intensity of exterior lighting of the vehicle. The optical device having a light emitting diode (LED) socket configured to be attached to the rear of the vehicle, a light positioned within the LED socket and configured to emit light rays, an inner lens positioned within the LED socket and configured to receive the light rays, an outer lens positioned within the LED socket and surrounding the inner lens to protect the inner lens, and a gasket positioned in front of or attached to the outer lens to create a cut pattern to allow the light rays to be focused in a desired area or region.

The outer lens may include some optics that direct the light coming from the inner lens. The outer lens may direct the light in a direction different from the inner lens. In some embodiments, a gasket may be placed in front of or attached to the outer lens to create a cut pattern to allow the light to be focused in a desired area or region. This creates an optical system that in combination with the LED socket, the inner lens, and the outer lens, directs the light towards a desired area or region of the rear of the vehicle.

Figure 1:
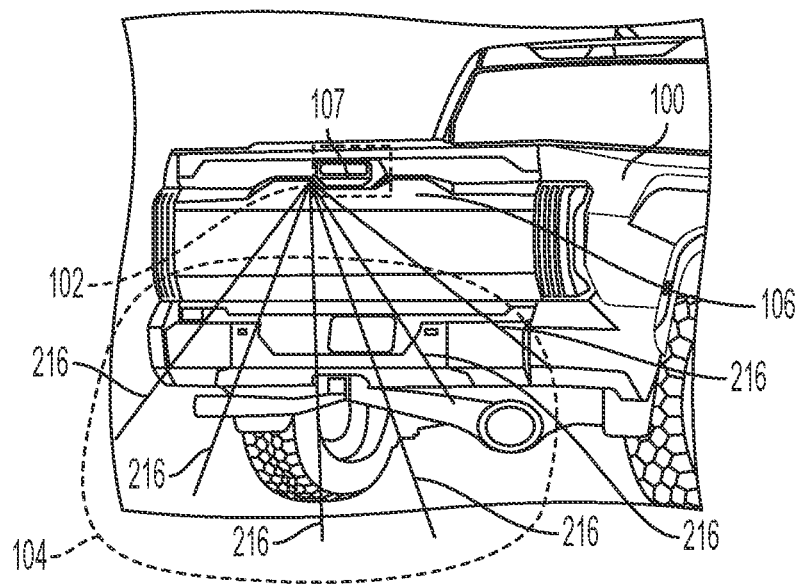
FIG. 1 is a rear perspective view of a vehicle having an optical device or system for illuminating a rear portion of the vehicle according to an embodiment of the present invention.

Turning to FIG. 1, a vehicle 100 may include an optical device 102 or system for illuminating a rear area and/or surroundings 104 of the vehicle 100. The optical device 102 may be removably connected to, attached to or integrated into a rear body portion 106 of the vehicle 100. The rear body portion 106 may be a tailgate on a truck, a trunk, a hatchback, or a door. As shown in FIG. 1 as an example, the optical device 102 is connected to or adjacent to a handle 107 that is used to open and close a tailgate of the truck.

The vehicle 100 may be a car, a bus, a utility vehicle, a truck, a motorcycle, a boat, an aircraft, or the like. The vehicle 100 may carry or transport people and/or cargo or merchandise. The vehicle 100 may be non-autonomous, fully autonomous, or semi-autonomous. In some embodiments, the vehicle 100 may be operated in an autonomous, semi-autonomous, or fully driver-operated state. In that regard, the vehicle 100 may be operated independently of driver control and, from time to time, without a person inside of the vehicle 100.

Figure 2:
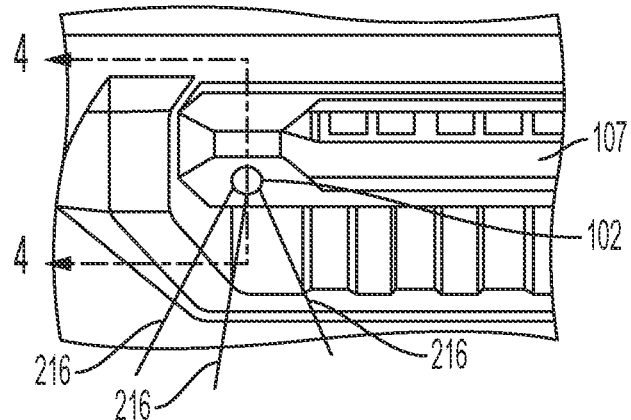
FIG. 2 is a front view of the optical device or system of FIG. 1 according to an embodiment of the present invention.

FIG. 2 is a front view of the optical device 102 or system of FIG. 1. As shown in FIGS. 1 and 2 as an example, the optical device 102 or system is positioned to direct the light rays 216 towards the ground or near a tow hitch attached to a rear portion of the vehicle 100.

Figure 3:
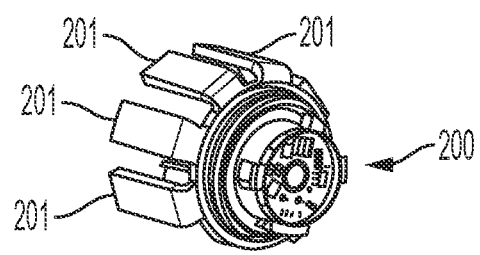
FIG. 3 is a front perspective view of a LED socket that is part of the optical device or system according to an embodiment of the present invention.

FIG. 3 is a front perspective view of a light emitting diode (LED) socket 200 that is part of the optical device 102 or system. The LED socket 200 has a simple design for providing illumination to the rear of the vehicle 100 and is easy to install and removal from the rear body portion 106 of the vehicle 100. The LED socket 200 can be easily removed to replace the light source 206, the inner lens 210, and/or the outer lens 212 should any of these elements become damaged or inoperative. The LED socket 200 has a number of fingers 201 that span around in a circular shape. The fingers 201 may have the same or a different shape or size. In some embodiments, advantageously, each finger 201 has a different shape or size for proper attachment or installation to the rear body portion 106 of the vehicle 100.

Figure 4:
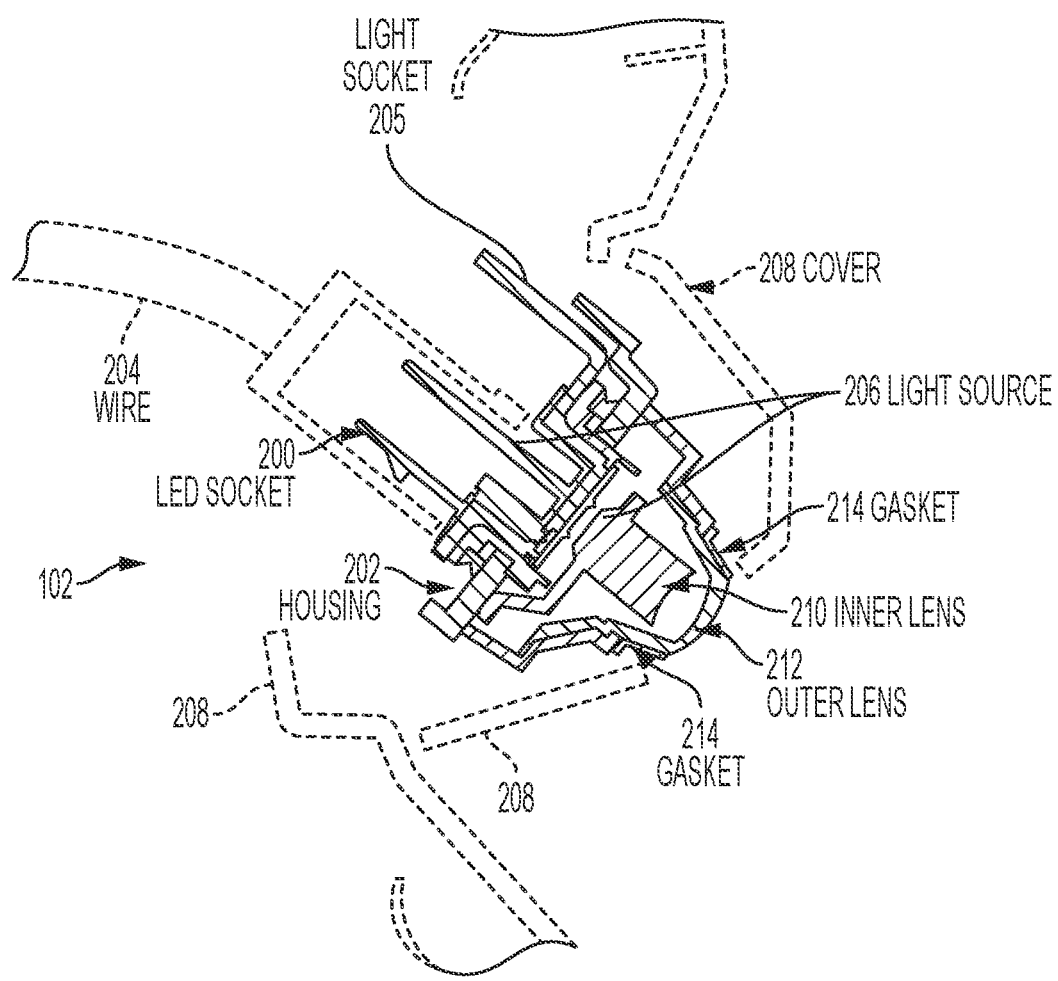
FIG. 4 is a cross-sectional view along 4-4 of FIG. 2 showing the elements and features of the optical device according to an embodiment of the present invention.
Figure 5:
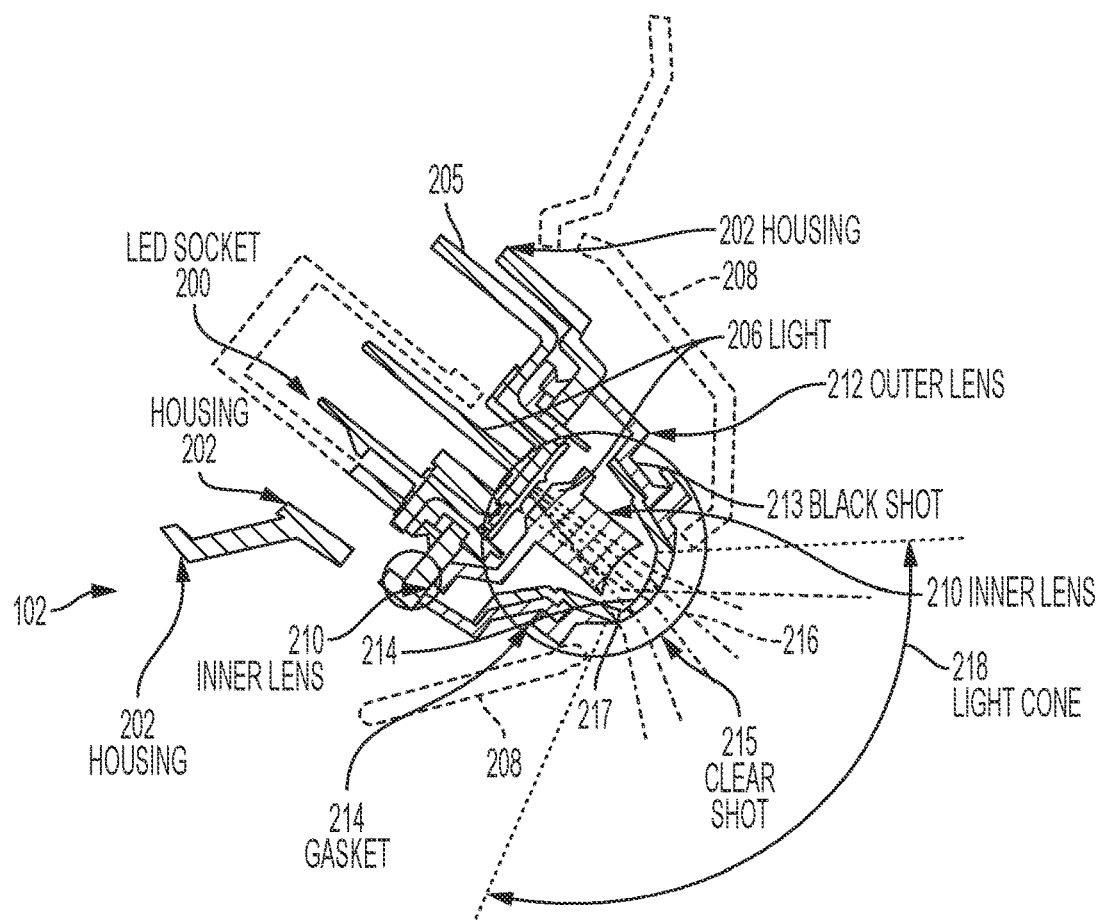
FIG. 5 is a detailed cross-sectional view along 4-4 of FIG. 2 showing the elements and features of the optical device according to an embodiment of the present invention.

FIG. 4 is a cross-sectional view along A-A of FIG. 2 showing the elements and features of the optical device 102. FIG. 5 is a more detailed cross-sectional view along A-A of FIG. 2 showing the elements and features of the optical device 102.

Referring to FIGS. 4 and 5, the optical device 102 may include a LED socket 200, a housing 202, an electrical connector or wire 204, a light socket 205, a light source 206, a cover 208, an inner lens 210, an outer lens 212, and a gasket 214. The cover 208 can be connected to or be part of the housing 202 to protect and cover the internal components. The cover 208 encompasses and surrounds the LED socket 200 and the internal components.

The LED socket 200 is used to hold the light 206 (e.g., an LED bulb) in place and to hold one or more of the components of the optical device 102. The light socket 205, the light source 206, the inner lens 210, and the outer lens 212 may all be encompassed within and/or attached to the LED socket 200 so when the LED socket 200 is removed, the light socket 205, the light source 206, the inner lens 210, and the outer lens 212 all can be removed as a single unit for easy replacement of the light socket 205, the light source 206, the inner lens 210, and the outer lens 212. The LED socket 200 may be connected or coupled to the housing 202.

The LED socket 200 has a lock feature for the removal and easy, proper installation of the light source 206. For example, the LED socket 200 or the housing 202 may include one or more (e.g., 4) fingers 201 arranged in a locking pattern so that installation is done correctly. Each finger 201 may be sized and shaped differently so that installation is done correctly. For example, the LED socket 200 can only fit into the housing 202 in one direction and orientation so that installation is done correctly. Each finger 201 is inserted into a specifically sized opening and then locks in place due to the fingers 201 moving inward. To remove the LED socket 200, the outer lens 212 may be pushed inward causing the fingers 201 to move outward and disengage from the openings, causing the LED socket 200 to be removed. Alternatively, the gasket 214 covers the LED socket 200 and holds it in place. When the gasket 214 is unscrewed, the LED socket 200 can be easily removed and the internal components of the LED socket 200 can be replaced. The gasket 214 is also used to seal the LED socket 200 and components from water and other contaminants.

The electrical connector or wire 204 is connected to the light socket 205 for providing power or electrical current and/or voltage to the light source 206. The light source 206 may be a LED light, a light bulb, or other illumination device. The light source 206 may be positioned within the LED socket 200 for directing light or light rays 216 in a first direction or scattering the light 216. The optional cover 208 may be used to protect the optical device 102.

Figure 6:
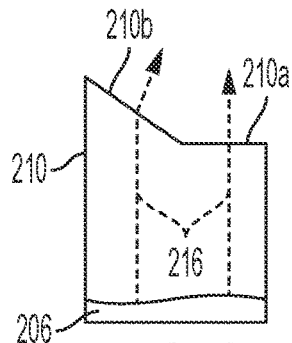
FIG. 6 is a cross-sectional view of the flat portion and the angled portion of the inner lens according to an embodiment of the present invention.

The inner lens 210 may be rectangular or cylindrical in shape. The end of the inner lens 210 may have a flat portion 210*a* and an angled portion 210*b*. FIG. 6 is a cross-sectional view of the flat portion 210*a* and the angled portion 210*b*. The flat portion 210*a* allows the light rays 216 from the light source 206 to pass directly through the inner lens 210 without much deflection or change in angle as shown in FIG. 6. The angled portion 210*b* causes the light rays 216 from the light source 206 to be deflected (i.e., a change in angle) as the light rays 216 exit the inner lens 210 as shown in FIG. 6. Referring to FIGS. 5 and 6, the combination of the flat portion 210*a* and the angled portion 210*b* advantageously allows some of the light rays 216 to pass straight through while other light rays 216 to be deflected or scattered to allow a broader area for the light to shine on. Hence, a dome-shaped inside surface 218 created by the light source 206 is might wider and scattered due to the multi-angled inner lens 210.

The outer lens 212 is spaced apart from the inner lens 210 and protects the inner lens 210. The outer lens 212 has side portions 213 that are black shot (i.e., opaque) and a front portion 217 that is clear shot (i.e., translucent or transparent). The front portion 217 has an inside surface 218 and an outside surface 215 (see also FIGS. 7A and 7B). The outer lens 212 is made from a co-molded plastic such that the side portions 213 are made or formed of a black plastic material (e.g., a black polycarbonate material) and the front portion 217 is made or formed of a clear plastic material (e.g., a clear polycarbonate material). The outer lens 212 is concentric with and encompasses or encircles the inner lens 210. The outer lens 212 redirects the light rays 216 in a different direction than the inner lens 210 and the gasket 214 blocks some of the light rays 216 so that the light rays 216 are further directed or focused in a specific direction or towards a specific area. The outer lens 212 has some back side optics to redirect the light rays 216 coming from the inner lens 210 to direct or shine the light rays 216 in a specific area and the gasket 214 further focuses the light rays 216 in a specific area. The outer lens 212 serves a double purpose which is to pass the light rays 216 therethrough and to protect the inner optics (e.g., the light source 206) from the exterior.

The front portion 217 is the lens where light travels through. The light rays 216 go through the inner lens 210, then go through the outer lens 212. The light rays 216 do not pass through the side portions 213 due to make up of the black plastic material. The light rays 216 may change direction between the inner lens 210 and the outer lens 212 due to the angled portion 210*b* of the inner lens 210. The outer lens 212 is spaced apart from the inner lens 210. The outer lens 212 is used to protect the inner lens 210.

Figure 7A:
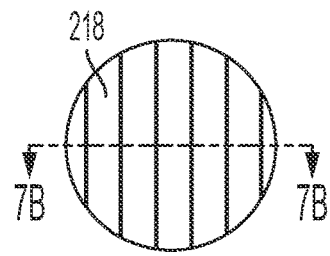
FIG. 7A is an inside front view of the dome-shaped inside surface of the outer lens according to an embodiment of the present invention.
Figure 7B:
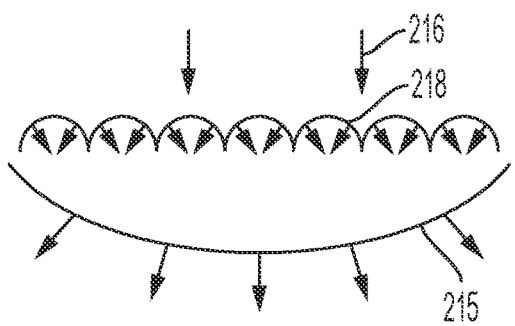
FIG. 7B is a cross-sectional view along 7B-7B of FIG. 7A showing the dome-shaped inside surface of the outer lens according to an embodiment of the present invention.

FIG. 7A is an inside front view of the dome-shaped inside surface 218 of the outer lens 212 and FIG. 7B is a cross-sectional view along 7B-7B of FIG. 7A showing the dome-shaped inside surface 218 of the outer lens 212. As shown in FIG. 7A, the dome-shaped inside surface 218 extends along the entire length or width of the outer lens 212. The number of dome-shaped portions can vary from 1-10 depending on the size of the outer lens and the amount of scattering desired. The light rays 216 hit the convex surface of the outer lens 212. The light rays 216 are then directed inward (as shown by the arrows) due to the dome-shaped inside surface 218. The light rays 216 may be spread out and scattered by the outer surface 215 due to the dome-shaped inside surface 218 (see also FIGS. 7A and 7B). The light rays 216 then hit the outside surface 215. The outside surface 215 is curved and formed in a convex shape to direct the light rays 216 in an outward direction.

Referring to FIGS. 5 and 6, the gasket 214 is made of a removable plastic or rubber material that fits around the outer lens 212 and snaps onto the side portions 213 of the outer lens 212 and/or the housing 202. The gasket 214 is a covering around or adjacent to the outer lens 212 to protect the outer lens 212 and prevent the light rays 216 for exiting the sides of the outer lens 212. In one embodiment, the gasket 214 covers at least a portion of the outside surface 215 of the front portion 217 of the outer lens 212 (see also FIG. 8). The gasket 214 is also used to block some of the light rays 216 where the gasket 214 is positioned and direct some of the light rays 216 towards the ground behind the vehicle 100 and/or near or towards a tow hitch of the vehicle 100.

Figure 8:
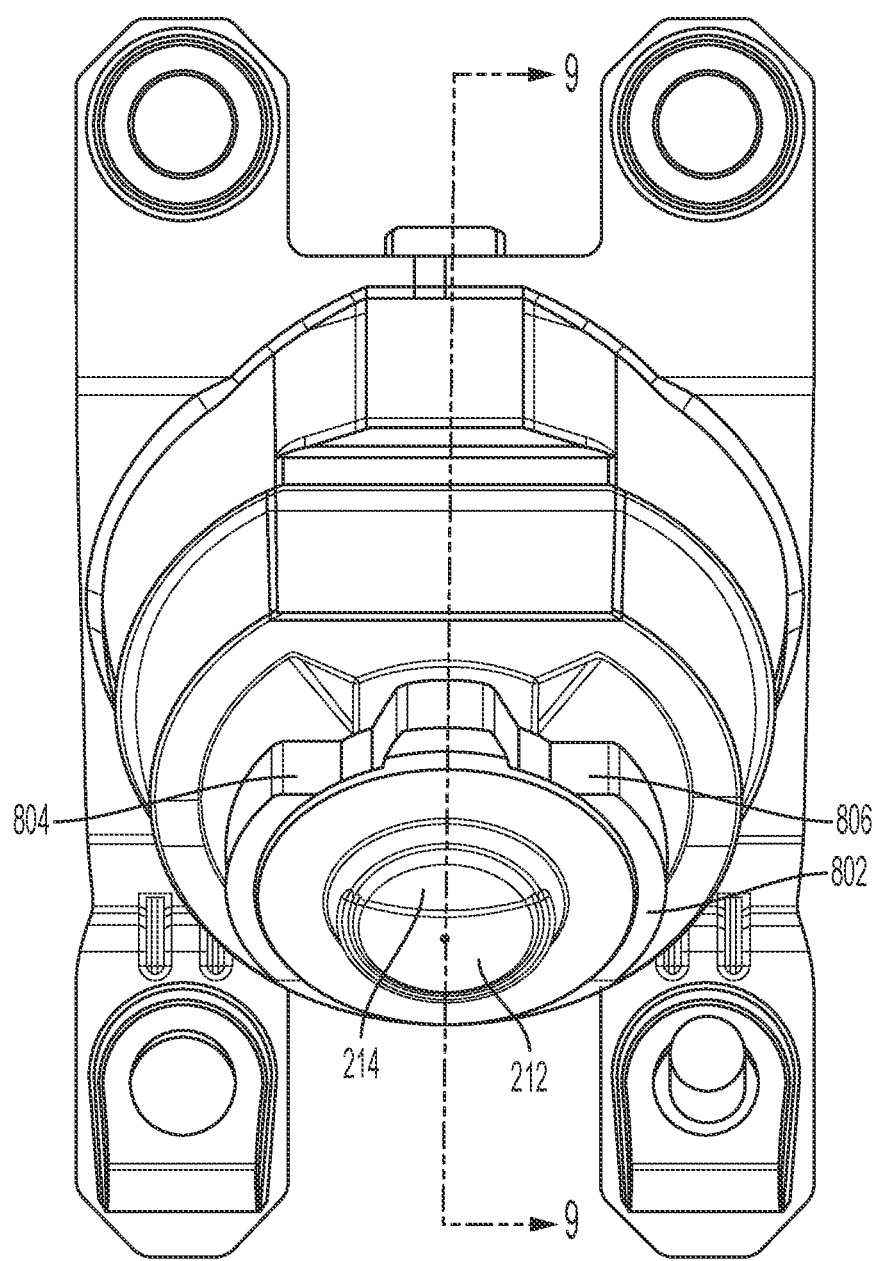
FIG. 8 is a perspective view of the gasket covering a portion of the outside surface of the front portion of the outer lens according to an embodiment of the present invention.
Figure 9:
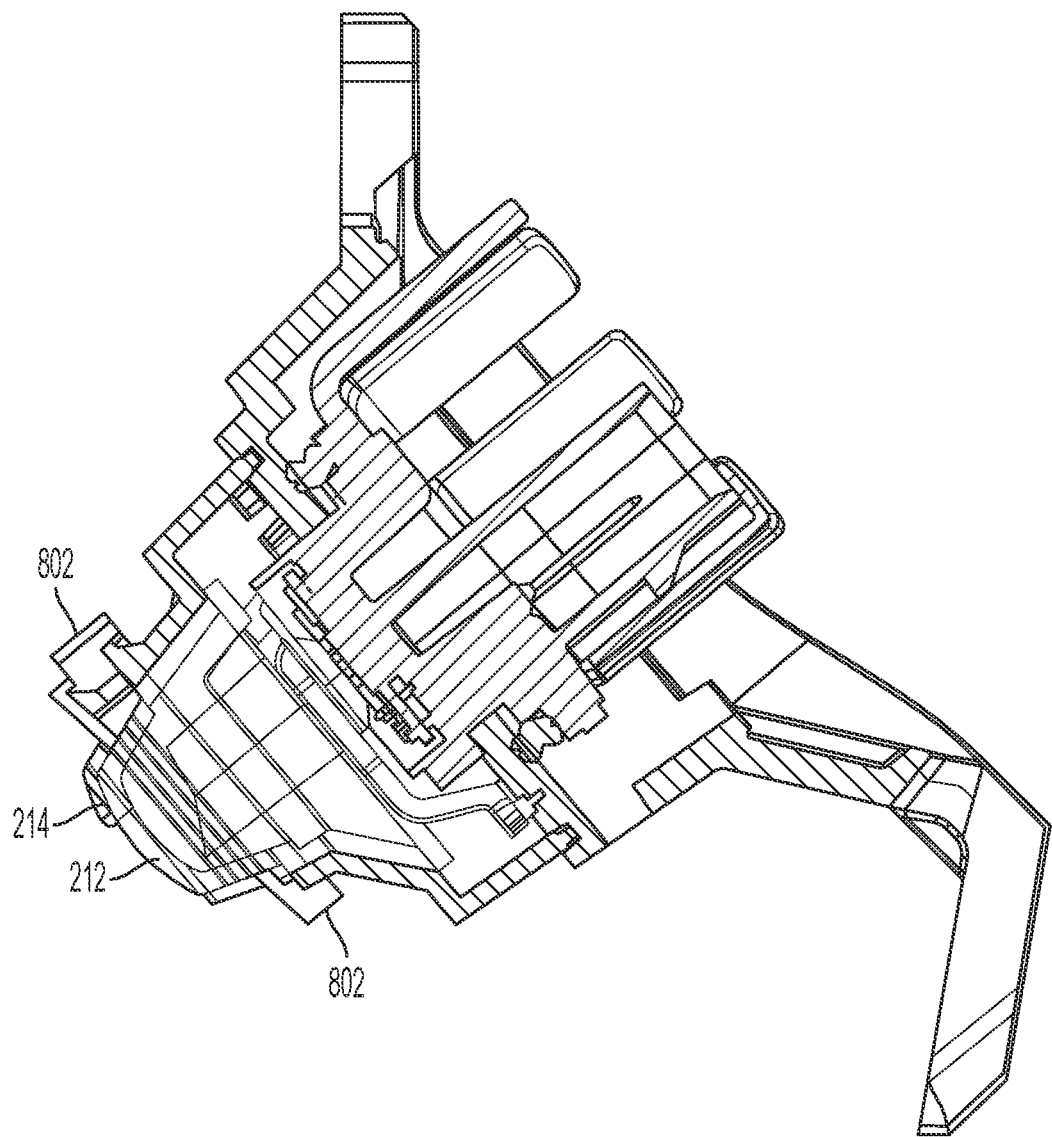
FIG. 9 is a cross-sectional view along 9-9 of FIG. 8 showing the gasket and the outer lens according to an embodiment of the present invention.

FIG. 8 is a perspective view of the gasket 214 covering a top portion of the outside surface 215 of the front portion 217 of the outer lens 212. FIG. 9 is a cross-sectional view along 9-9 of FIG. 8 showing the gasket 214 and the outer lens 212. As shown in FIGS. 8 and 9, the gasket 214 covers between 10 percent and 35 percent of the outer lens 212 in order to direct all or most of the light rays 216 through the uncovered portion of the outer lens 212 and towards a certain area. This advantageously allows for more of the light rays 216 to be directed and focused to a certain area (e.g., the ground near the tow hitch) for brighter and greater intensity light. The gasket 214 is made of a non-flammable, plastic or metal material. The gasket 214 may be slightly spaced apart (i.e., not in contact with) from the outer lens 212 to prevent the outer lens 212 and/or the gasket 214 from overheating. A circular handle 802 with notches 804, 806 can be screwed and unscrewed to allow the LED socket 200 to be accessed and removed. That is, the circular handle 802 can be unscrewed to remove the LED socket 200 from the housing 202. The notches 804, 806 are used to better grip the circular handle 802. Once one or more of the components of the LED socket 200 is replaced, the LED socket 200 can be reinserted into the housing 202 and the circular handle 802 can be screwed in to hold and secure the LED socket 200 in place.

Figure 12:
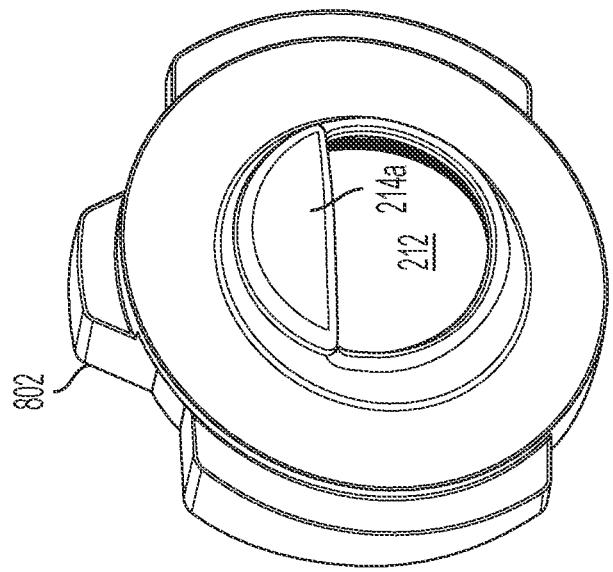
FIG. 12 is a front perspective view of the gasket according to an embodiment of the present invention.
Figure 11:
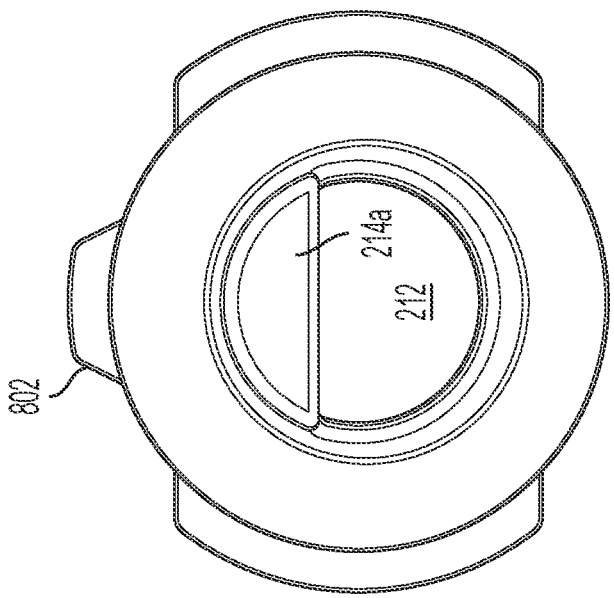
FIG. 11 is a front view of the gasket according to an embodiment of the present invention.
Figure 10:
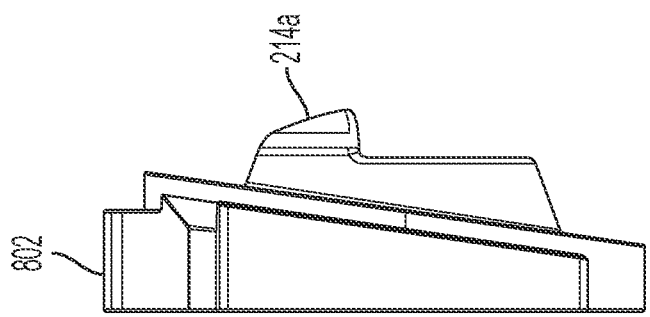
FIG. 10 is a side view of the gasket according to an embodiment of the present invention.

FIG. 10 is a side view of the gasket 214, FIG. 11 is a front view of the gasket 214, and FIG. 12 is a front perspective view of the gasket 214 according to an embodiment of the present invention. As shown in FIGS. 10-12, the gasket 214 covers the sides and a top portion of the outside surface 215 of the front portion 217 of the outer lens 212. Hence, the gasket 214 blocks some of the light rays 216 and redirects some of the light rays 216 towards the ground behind the vehicle 100 and/or near or towards a tow hitch of the vehicle 100. The gasket 214 covers about 30 percent of the outer lens 212. The gasket 214 advantageously covers the top portion of the outer lens 212 so that the light rays 216 are focused downward. The front portion of the gasket 214 can have a half moon shape or a quarter moon shape.

Figure 14:
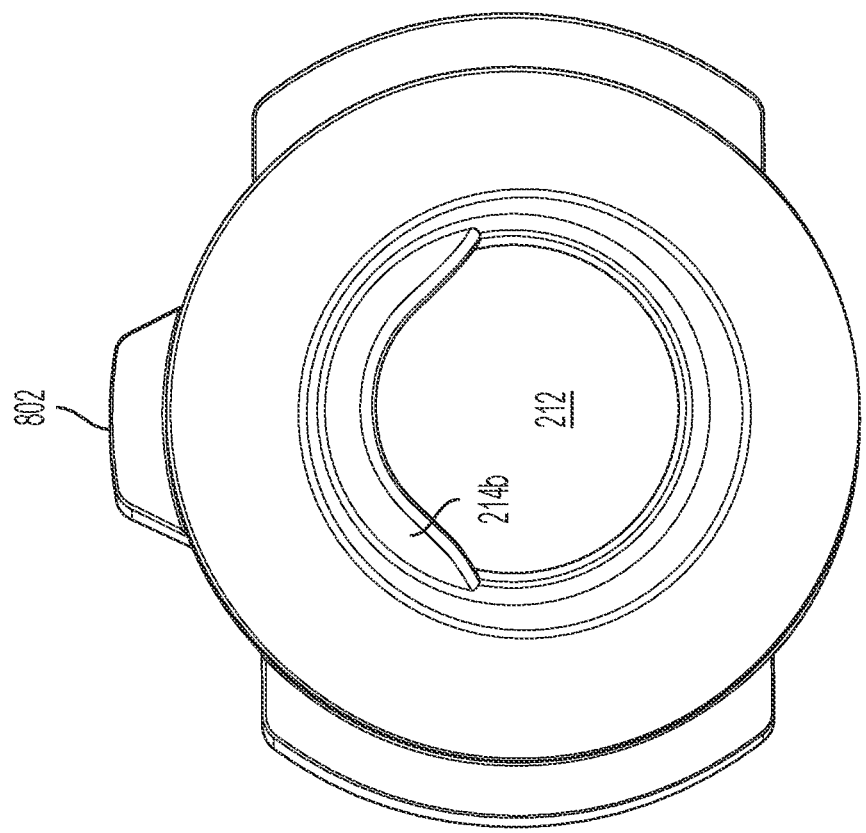
FIG. 14 is a front view of the gasket according to another embodiment of the present invention.
Figure 13:
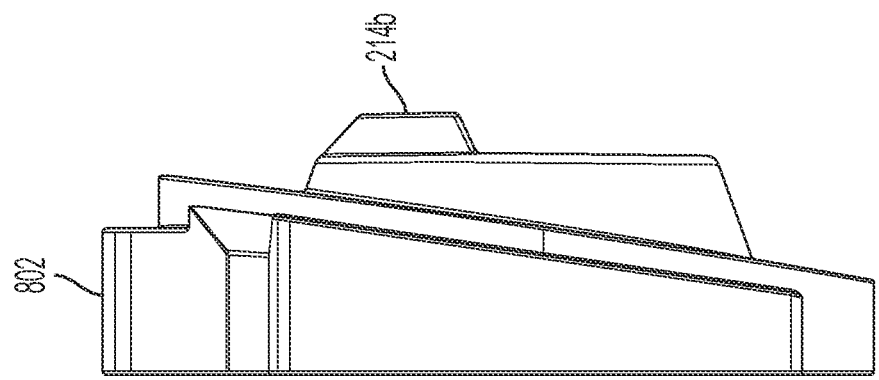
FIG. 13 is a side view of the gasket according to another embodiment of the present invention.
Figure 15:
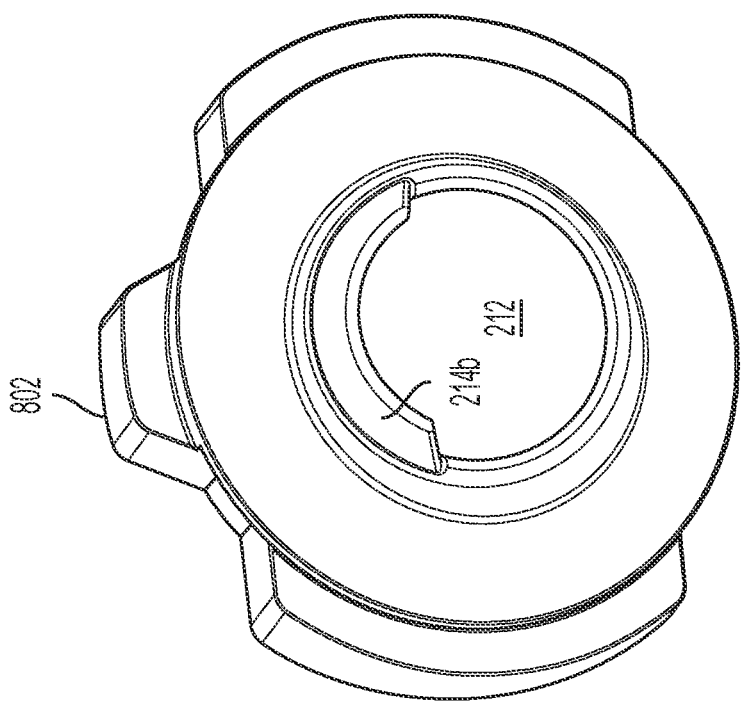
FIG. 15 is a front perspective view of the gasket according to another embodiment of the present invention.

FIG. 13 is a side view of the gasket 214, FIG. 14 is a front view of the gasket 214, and FIG. 15 is a front perspective view of the gasket 214 according to another embodiment of the present invention. As shown in FIGS. 13-15, the gasket 214 covers the sides and a top portion of the outside surface 215 of the front portion 217 of the outer lens 212. Hence, the gasket 214 blocks some of the light rays 216 and redirects some of the light rays 216 towards the ground behind the vehicle 100 and/or near or towards a tow hitch of the vehicle 100. The gasket 214 covers about 10 percent of the outer lens 212. The gasket 214 advantageously covers the top portion of the outer lens 212 so that the light rays 216 are focused downward. The gasket 214b can have a curved visor shape to direct the light rays 216 downward.

Figure 16:
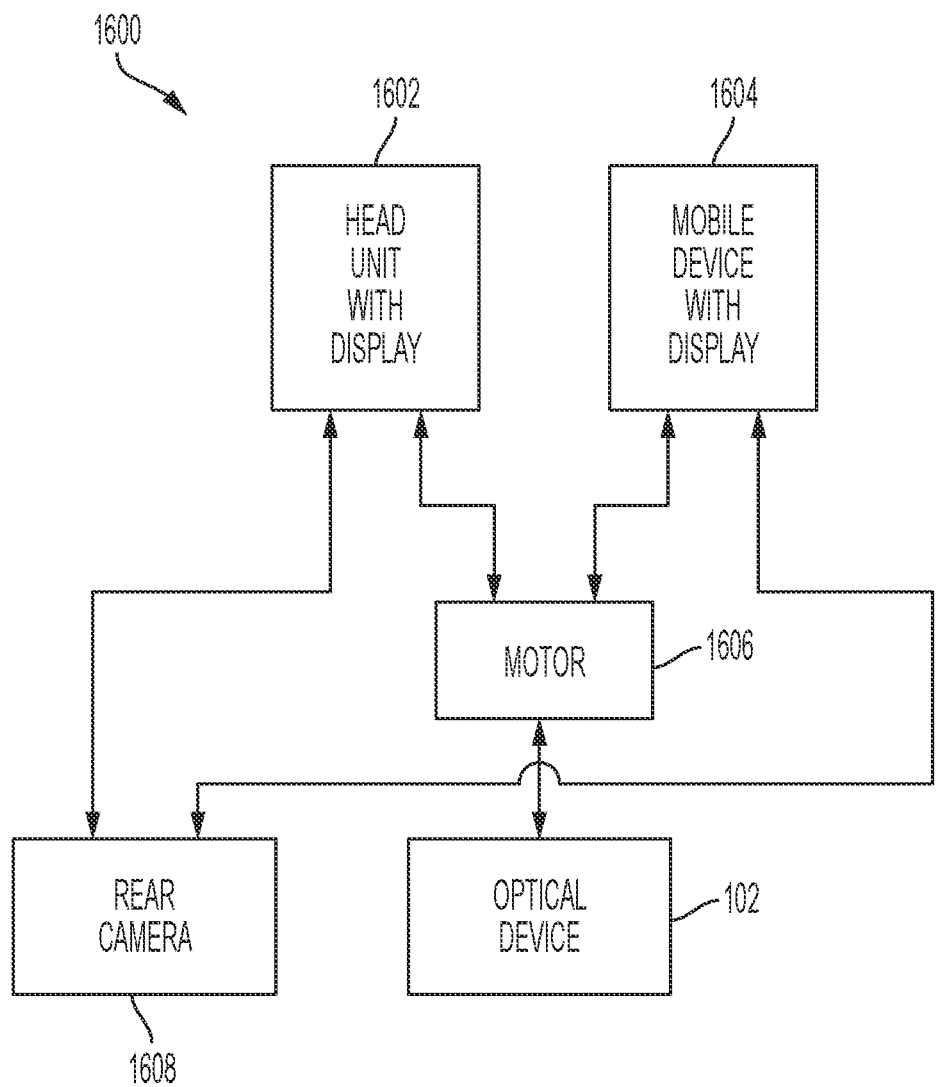
FIG. 16 is a block diagram of a system for controlling the direction of the light rays emitted from the light according to an embodiment of the present invention.

FIG. 16 is a block diagram of a system 1600 for controlling the direction of the light rays 216 emitted from the light 206. The direction and movement of the light 206 can be controlled by a head unit 1602 of a vehicle or a mobile device 1604. An application can be loaded on the head unit 1602 or the mobile device 1604 to electronically and wirelessly control the movement of the light 206 via the motor 1606. The motor 1606 may be coupled or connected to one or more of the components of the optical device 102 (e.g., the LED socket 200 including the light 206, the inner lens 210, and/or the outer lens 212) for adjusting the direction of the light rays 216 emitted from the light 206. The motor 1606 may be wirelessly coupled to the vehicle head unit 1602, which is configured to control the motor 1606 to adjust the light rays 216 emitted from the light 206. The motor 1606 may be wirelessly coupled to the mobile device 1604, which is configured to control the motor 1606 to adjust the light rays 216 emitted from the light 206.

The display of the head unit 1602 or the mobile device 1604 can be a touch screen with 4 arrows, denoting up, down, left and right. The display can also show an image(s) of the rear of the vehicle (using a rear camera 1608 or a sensor) to show where the light rays 216 are shining. The rear camera 1608 or the sensor can be part of the back-up camera system of the vehicle. The rear camera 1608 can be connected to or coupled to the head unit 1602 or the mobile device 1604. The user can then control, via the head unit 1602 or the mobile device 1604, the optical device 102 and/or the rear camera 1608. The optical device 102 and the rear camera 1608 can be synchronously controlled to be directed at the same place so the user can adjust both the optical device 102 and the rear camera at the same time. This advantageously allows the user to simultaneously control and direct the light rays 216 and the rear camera 1608 to the same location.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An optical device configured to be attached to a rear of a vehicle to control the direction and intensity of exterior lighting of the vehicle, the optical device comprising:
   a socket configured to be attached to the rear of the vehicle;
   a light positioned within the socket and configured to emit light rays;
   an inner lens positioned within the socket and configured to receive the light rays;
   an outer lens positioned within the socket and surrounding the inner lens, the outer lens having side portions made of a black plastic material and a front portion made of a clear plastic material, the outer lens formed of a co-molded plastic material; and
   a molded plastic device positioned in front of or attached to the outer lens to create a cut pattern to allow the light rays to be focused in a desired area.

2. The optical device of claim 1, wherein a front portion of the molded plastic device is formed in the shape of a half moon or a quarter moon.

3. The optical device of claim 1, wherein the molded plastic device is made of a plastic or rubber material and is configured to removably snap onto side portions of the outer lens.

4. The optical device of claim 1, wherein the molded plastic device is a covering around or adjacent to the outer lens to protect the outer lens and prevent the light rays for exiting the sides of the outer lens.

5. The optical device of claim 1, wherein the molded plastic device covers side portions of the outer lens.

6. The optical device of claim 1, wherein the molded plastic device has a curved visor shape to direct the light rays downward.

7. The optical device of claim 1, wherein the molded plastic device covers the socket and holds it in place.

8. The optical device of claim 1, wherein the socket is removable to allow for replacement of the light.

9. The optical device of claim 1, wherein the molded plastic device covers between 10 percent and 30 percent of the outer lens.

10. An optical device configured to be attached to a rear of a vehicle to control the direction and intensity of exterior lighting of the vehicle, the optical device comprising:
    a socket configured to be attached to the rear of the vehicle;
    a light positioned within the socket and configured to emit light rays;
    an inner lens positioned within the socket and configured to receive the light rays;
    an outer lens positioned within the socket and surrounding the inner lens; and
    a molded plastic device blocking a portion of the outer lens to direct the light rays to be focused in a desired area, the molded plastic device covering between 10 percent and 30 percent of the outer lens.

11. The optical device of claim 10, wherein a front portion of the molded plastic device is formed in the shape of a half moon or a quarter moon.

12. The optical device of claim 10, wherein the molded plastic device is made of a plastic or rubber material and is configured to removably snap onto side portions of the outer lens.

13. The optical device of claim 10, wherein the molded plastic device is a covering around or adjacent to the outer lens to protect the outer lens and prevent the light rays for exiting the sides of the outer lens.

14. The optical device of claim 10, wherein the molded plastic device covers side portions of the outer lens.

15. The optical device of claim 10, wherein the molded plastic device has a curved visor shape to direct the light rays downward.

16. The optical device of claim 10, wherein the molded plastic device covers the socket and holds it in place.

17. The optical device of claim 10, wherein the socket is removable to allow for replacement of the light.

18. The optical device of claim 10, wherein the outer lens has side portions made of a black plastic material and a front portion made of a clear plastic material, wherein the side portions and the front portion of the outer lens are formed of a co-molded plastic material.

\* \* \* \* \*